United States Patent [19]

Takiyasu et al.

[11] Patent Number: 4,975,906
[45] Date of Patent: Dec. 4, 1990

[54] NETWORK SYSTEM

[75] Inventors: Yoshihiro Takiyasu, Higashimurayama; Toshiki Tanaka, Ome; Michio Asano, Tokorozawa; Masashi Ohno, Kokubunji; Takahiko Kozaki, Koganei, all of Japan

[73] Assignee: Hitachi, Ltd., Tokyo, Japan

[21] Appl. No.: 308,778

[22] Filed: Feb. 9, 1989

[30] Foreign Application Priority Data

Feb. 15, 1988 [JP] Japan .................................. 63-30738
Jun. 10, 1988 [JP] Japan ................................ 63-144525
Sep. 30, 1988 [JP] Japan ................................ 63-244399

[51] Int. Cl.$^5$ ........................... H04J 3/02; H04J 3/24
[52] U.S. Cl. ........................... 370/85.130; 370/94.1
[58] Field of Search ...................... 370/60, 88, 85, 94, 370/60.1, 85.13, 94.1, 94.2, 94.3, 85.14

[56] References Cited

U.S. PATENT DOCUMENTS

| | | | |
|---|---|---|---|
| 4,081,612 | 3/1978 | Hafner | 370/60 |
| 4,587,651 | 5/1986 | Nelson et al. | 370/88 |
| 4,597,078 | 6/1986 | Kempf | 370/88 |
| 4,603,416 | 7/1986 | Servel et al. | 370/60 |
| 4,731,784 | 3/1988 | Keller et al. | 370/88 |

FOREIGN PATENT DOCUMENTS 2931173 10/1982 Fed. Rep. of Germany.

OTHER PUBLICATIONS

Thomas, A., Coudreuse J. P., Serval, M; "Asynchronous Time Division Techniques: A Experimental Packet Network Integrating Video Communication", ISS 1984, May 1984.

Primary Examiner—Douglas W. Olms
Assistant Examiner—Wellington Chin
Attorney, Agent, or Firm—Antonelli, Terry, Stout & Kraus

[57] ABSTRACT

In a netowrk system having a plurality of LANs each connecting a plurality of terminals interconnected, a LAN interconnection switching unit for switching and relaying data receives data frames from LANs and sends out a call set-up frame including a call number assigned to a combination of source and destination terminal addresses and addresses of relaying interconnection switching units. The data received from LAN is segmented into packets, which are sent out together with the call number. The interconnection switching unit switches and relays data by using data frame error detection scheme in the LAN. Information for controlling a switching sequence is added to the data frame from the LAN to prevent the interruption by the packet having a different call number.

12 Claims, 17 Drawing Sheets

NETWORK SYSTEM

FIG. 8

| | TYPE OF TABLE | INFORMATION IN TABLE | INFORMATION LENG |
|---|---|---|---|
| 1 MEDIUM UNIT | FILTERING TABLE (T1) | LAN TERMINAL ADDRESS CONNECTED TO INTERCONNECTION SWITCHING UNIT OF ITS OWN | 6 Bytes — 601 |
| 2 | ROUTING TABLE (T2) | DESTINATION LAN TERMINAL ADDRESS | 6 Bytes — 602 |
| | | OUTPUT PORT IDENTIFIER | 1 Byte — 603 |
| | | INDENTIFIER CHAIN OF LAN INTERCONNECTION SWITCHING UNIT | 1 × 9 Bytes — 604 |
| | | LART PORT IDENTIFIER | 1 Byte — 605 |
| 3 | SET-UP CALL TABLE (T3) | SOURCE LAN TERMINAL ADDRESS | 6 Bytes — 606 |
| | | DESTINATION LAN TERMINAL ADDRESS | 6 Bytes — 607 |
| | | OUTPUT LCA (CALL NUMBER) | 2 Bytes — 608 |
| | | OUTPUT PORT IDENTIFIER | 1 Byte — 603' |
| 4 LINK UNIT | RELAY TABLE (T4) | INPUT LCA | 2 Bytes — 610 |
| | | OUTPUT LCA | 2 Bytes — 612 |
| | | OUTPUT PORT IDENTIFIER | 1 Byte — 603'' |
| 5 | OUTPUT CALL TABLE (T5) | OUTPUT LCA | 2 Bytes — 612' |
| | | INPUT PORT IDENTIFIER | 1 Byte — 615 |
| | | INPUT PORT USE LCA | 2 Bytes — 616 |
| 6 | STRUCTURE TABLE (T6) | ADJACENT LAN INTERCONNECTION SWITCHING UNIT IDENTIFIER | Byte — 617 |
| | | CONNECTING PORT IDENTIFIER | Byte — 618 |

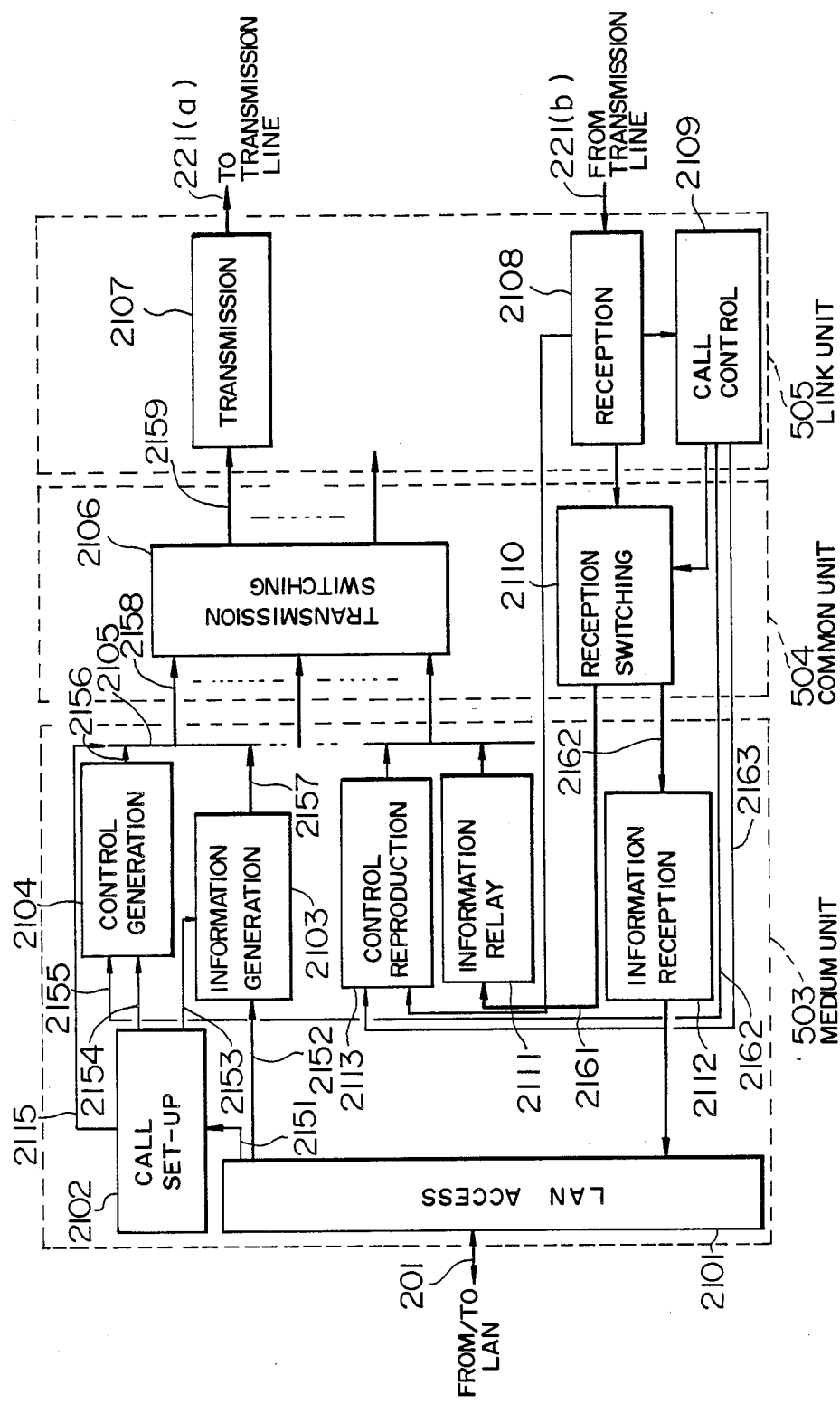

FIG. 17

| OWN / OTHER | "I" | "O" |
|---|---|---|
| "I" | OWN | OTHER |
| "O" | OTHER | OTHER |

NETWORK SYSTEM

BACKGROUND OF THE INVENTION

The present invention relates to a network system for interconnecting a plurality of local area networks (LANs), and more particularly to a system suitable for rapidly and efficiently switching data between LANs.

In the past, discussion about a high speed interconnection unit for a plurality of LANs has been made on a bridge of a connection system for a MAC (media access control) layer which is a sublayer of an OSI (open systems interconnection) reference model in the 802.1 Committee which is one of the IEEE LAN standardization committees.

Application of relay path designation information to a transmission frame by a transmission terminal done to attain high speed relaying of a communication frame, error detection in the designation information and a logical protocol stack of a bridge are disclosed in JP-A-No. 60-264142 and JP-A-No. 60-264143 corresponding as filed by priority documents to U.S. application Ser. Nos. 616,742 and 616,743, respectively, each filed on June 4, 1984.

A high speed packet switching system is discussed in "PARIS: An Approach to Integrated Private Networks" Israel Cidon et al, IEEE, ICC 1987, 22.1.1–1.5. Technique for high speed relaying is based on the same concept as that of the path designation method disclosed in JP-A-60-264142.

A conventional cell switching system for switching a fixed length packet or cell is discussed in "PRELUDE: An Asynchronous Time-Division Switched Network" by Jean-Pierre Condreuse et al, ICC '87 22.2.1–22.2.6.

The bridge which is the MAC (media access control) layer interconnection relates to interconnection technique where a plurality of LANs to be interconnected are located in a relatively short distance. Each bridge is directly connected to the LAN without intervention of another network for connection.

On the other hand, the relay path designation system which imparts path information to all data frames can accelerate the relaying of the frames but it poses problems of reduction of an occupancy rate of information to be transmitted in the data frame and the necessity of preparation of the relay path at the terminal station at which the data frame is generated.

SUMMARY OF THE INVENTION

It is an object of the present invention to attain high speed relaying without significantly reducing an information occupancy rate in a data frame and without repeating relay route preparation at a data frame generation terminal station for those data which have a common relay route consecutively generated at a short time interval.

It is another object of the present invention to provide a data switching/multiplexer which attains interconnection of LAN's which is a connectionless network by an ATM (asynchronous transfer mode) network with a performance equivalent to a communication quality in a conventional bridge connection.

It is another object of the present invention to provide a data switching/multiplexer in a communication network which uses cells (fixed length minislots) which can significantly reduce amounts of buffer or hardware, which eliminates need for retransmission of data and which reduces a mean delay time for transmission.

It is another object of the present invention to provide a data switching/multiplexer in which a cell train generated from one user frame does not accept a cell generated from another user frame so that the amount of user frame reproducing buffer and hardware for sequence confirmation logic is significantly reduced.

It is another object of the present invention to provide a data switching/multiplexer in which multiplication is effected by a unit of user frame so that the user frame which is discarded in the reassembling frame is not present and a mean delay time due to retransmission is reduced.

It is another object of the present invention to provide a network system which enables error detection in an interconnection network to improve data reliability without lowering a transfer efficiency.

It is another object of the present invention to provide a data switching/multiplexer which detects an error in an interconnection network by using an error detection technique used in individual networks in transmission and received terminal interconnection switching unit, without adding error detection information to a transfer packet in the interconnection network.

The packet used in the LAN adopts a connectionless system (in which no call signal is sent to a destination station but data is directly sent to the destination station). Where a connection oriented system in which a call signal is first sent before information is sent is used like a telephone communication, the destination station may start preparation for data received after it has received the call signal. A connection oriented system in which the call signal or control signal is sent or received over a channel other than the channel used for data transfer is called an out-of-band call signal control system.

The cell switching and statistical multiplexing system by the out-of-band call signal control system is called an ATM (asynchronous transfer mode) which is currently discussed in CCITT.

The above objects are achieved by a network comprising a plurality of LANs and an interconnecting communication network in which LAN interconnection units which connect the LANs to the communication network define relay routes and relay stations in advance to data transfer and inform the relay routes and call numbers which uniquely identify the relay routes to the LAN interconnection units which serve as the relay stations. After such notice, the data is sent by using the call numbers.

Each of the LAN interconnection units has a filtering table, a routing table and a relay table.

The filtering table is used to determine whether the data received from the LAN is the communication data in the LAN which is directly connected to the LAN interconnection unit. The routing table is used to determine a LAN interconnection unit address chain (relay route) or destination LAN terminal address (or LAN address) which relays the received LAN frame and an output line number, based on an address of the received LAN frame. The call signal number is informed, as a part of call setting information frame, to the adjacent LAN interconnection unit through the output line identified by the output line number. The succeeding LAN interconnection units sequentially relay the call setting frame in accordance with the LAN interconnection unit address sequence in the call setting frame, and prepare the relation between the call number and the address of the next interconnection unit in the relay tables. Thus, in the subsequent data transfer, the relay route can be specified by merely attaching the call signal number. Since an information length of the call signal number is much shorter than that of the addresses of a source station and a destination station or that of the address sequence of the LAN interconnection units which serve as relay stations, high speed relaying is attained in the present invention without substantially lowering the transmission information occupancy rate in the frame which is needed to specify the relay route.

The data switching/multiplexer for switching fixed length and short-size packet or cell having preassigned call signal numbers included in headers, in the out-of-band call control system and statistically multiplex the cells, in accordance with the present invention is characterized by that information for controlling the switching sequence is contained in the header. As a result, a series of cells generated from specific user data can be continuously switched and multiplexed until the last cell is reached without permitting interruption by a cell which has other call signal number in its header. A more data (M) bit which requests continuous switching and multiplexing of the cells generated from one user data is used as information to control the switching sequence contained in the header. The M of only the last cell of the specific cell train is set to "0" and the M's of other than last cells are set to "1". The M of exceptional cell such as a voice information cell is set to "0". If the exceptional cell having M="0" is present during the switching of the specific cell train having M="1", the exceptional cell is preferential switched. Even if a cell having M="1" and a different call signal number is present, the specific cell train is switched until the last cell is reached, and after the last one of the specific cell train has been switched, the cell having M="1" and the different call signal number is switched. When the cell comprising the header containing the more data (M) bit and the call signal number, and user information is to be switched, a call signal number filter for eliminating the cell in accordance with the call signal number and the value of the M is provided. The call signal number filter temporarily stores the call signal numbers of a series of head cells to permit continuous switching and multiplexing of those cells which have M="1" and whose call signal numbers are equal to the stored call signal numbers. If the call signal number of the cell coincides to the stored call signal number after the cell having M="0" has been switched, the switching and multiplexing of the cells from all input lines are permitted at the second priority, and if they are not coincident, the switching and multiple interruption of the cell having M="1" from other input line is inhibited. Instead of the call signal number contained in the header, a bit R indicating a cell train which requires the continuous switching and multiplexing ma be contained in the cell header, in addition to the M bit. (For example, the switching and multiplexing are requested when R is "1".) After the cell having M="1" and R="1" has been switched and multiplexed, the switching and multiplex interruption of the cell having R="1" from other input line to which the previous cell belongs are inhibited. After the cell having M="0" and R="1" has been switched and multiplexed, the switching and multiple interruption of the cells from all input liens are permitted. After the cell having M="0" and R="0" has been switched and multiplexed, the algorithm of the latest cell having R="1" is followed. Where the cells having M="1" or M="1" and R=1 continuously supplied from one input line is to be switched and multiplexed, a maximum number of continuous cells determined by a maximum user data length and a cell length is stored. The number of input cell train is counted and the count is compared with the stored number. If the count exceeds the maximum number of continuous cells, it is determined as an error and the switching and multiple interruption of the cells from all input lines are permitted.

In accordance with the present invention, the cell switching is controlled such that a cell generated from one LAN frame is not multiple-interrupted by other cell on one output line of a final destination ATM switching unit. To this end, an identifier for indicating that a cell generated from the same LAN frame succeeds is contained in a header of each cell. The cell switch performs continuous switching to the series of cells on the same input line identified by the identifier.

The packet inherently permits mass data transmission by multiplexing data at a sacrifice of delay of data. However, if a packet which put a weight on real time such as a packetized voice is significantly delayed, it deteriorates a quality of sound. In such a case, therefore, the packetized voice is to be processed by interrupting the switching of the cell train generated from one user data in order to minimize the delay. At the same time in order to prevent the increase and complexity of hardware due to multiplication, as many cells as possible generated from the same LAN frame are successively processed to eliminate check for absence of cell and reduce the capacity of the buffer memory.

Where cells generated from the same LAN frame are successively present on the output line, the final destination ATM switching unit for receiving those cells can sequentially reassemble into the LAN frame. Accordingly, the reassemble buffer memory may, in principle, have only a buffer memory for the cell under transfer to the destination LAN and a buffer memory for the cell under reassemble.

If a cell which indicates the last cell generated from the same LAN frame drops, the cells from other input line may not be processed. Since a maximum frame length is set in the LAN frame, the cells from all other input liens may be accepted when more cells than the maximum number of continuous cells calculated based on the cell length have been continuously received.

If the error detection technique used in the individual LAN's can be used, as they are, in the error check in the LAN interconnection network, the error in the interconnection network can be detected without adding unique error detection information to each packet as has bee done in the prior art.

In the network system of the present invention, when a switching unit connected to a transmission terminal receives a switching frame from an individual network thereunder or a switching unit connected to a received terminal receives a switching frame from an interconnection network, error detection is effected by using an error detection technique in the switching frame (for example, FCS method) so that error-free frame is outputted.

An error detection circuit suitable to use in the network system of the present invention comprises a switching frame reassemble unit including a memory for storing a received switching frame and a detector for detecting last information of the switching frame, an error detection unit including an arithmetic and logic circuit for generating new error detection information in the switching fame and a comparator for comparing an output of the arithmetic and logic circuit with the error detection information in the switching frame, and an individual network interconnection unit for generating a transmission request for the switching frame stored in the memory in accordance with the output of the detector of the switching frame reassemble unit and the output of the comparator of the error detection unit.

When the switching unit connected to the transmission terminal receives transfer information from an individual network, it detects an error by the error detection technique employed in the individual network (for example, FCS method in a LAN), and sends an error-free transfer information to the interconnection network.

On the other hand, when the switching unit connected to the received terminal receives transfer information from an interconnection network, it generates new error detection information by the error detection technique (FCS method in the LAN) used in an individual network which is a destination of the transfer information and compares it with the error detection information in the transfer information. When they are equal, it means that the information was correctly transferred by the interconnection network, and when they are not equal, it means that an error has occurred in the interconnection network.

The interconnection network reserves and transfers the switching frame to be used in the individual network. AS a result, the error detection techniques in the individual networks at the source station and the destination station coincide.

In an interconnection network which uses a frame relaying for switching in a layer corresponding to a data link layer in the OSI reference model, addition of error detection information which is unique to the interconnection network is not necessary because error detection of the transfer information is not effected in the relay connection switching unit which merely relays within the interconnection network.

As a result, a ratio of the information length to the packet length increases and the information transfer efficiency is improved.

BRIEF DESCRIPTION OF THE DRAWINGS

FIGS. 7 to 9 show functional blocks and table in the LAN interconnection switching unit of the present invention, FIGS. 16 to 18 show a time chart for cell switching and multiplexing, a block diagram of the cell switching unit and a sequence chart for cell switching.

DESCRIPTION OF THE PREFERRED EMBODIMENTS

One embodiment of the present invention will now be explained with reference to the drawings.

Figure 1:
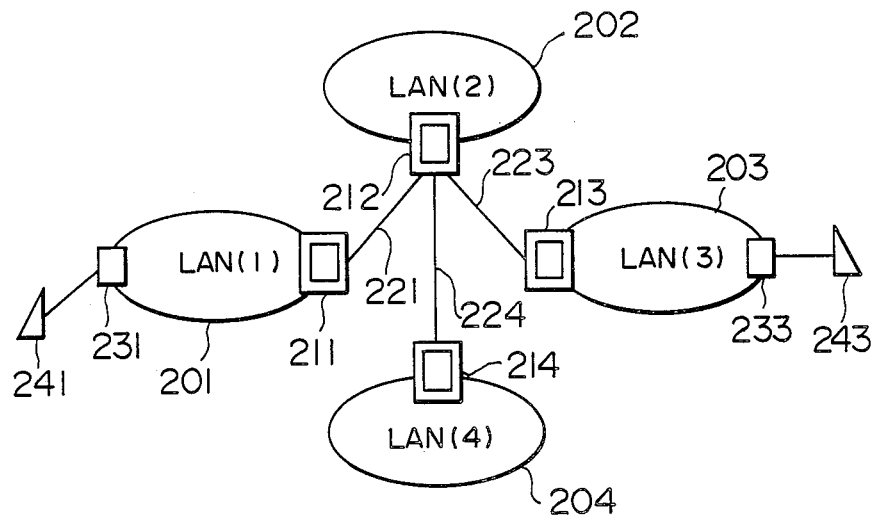
FIGS. 1 to 3 show overall configurations of systems which intercontact a plurality of LANs and PBXs.
Figure 2:
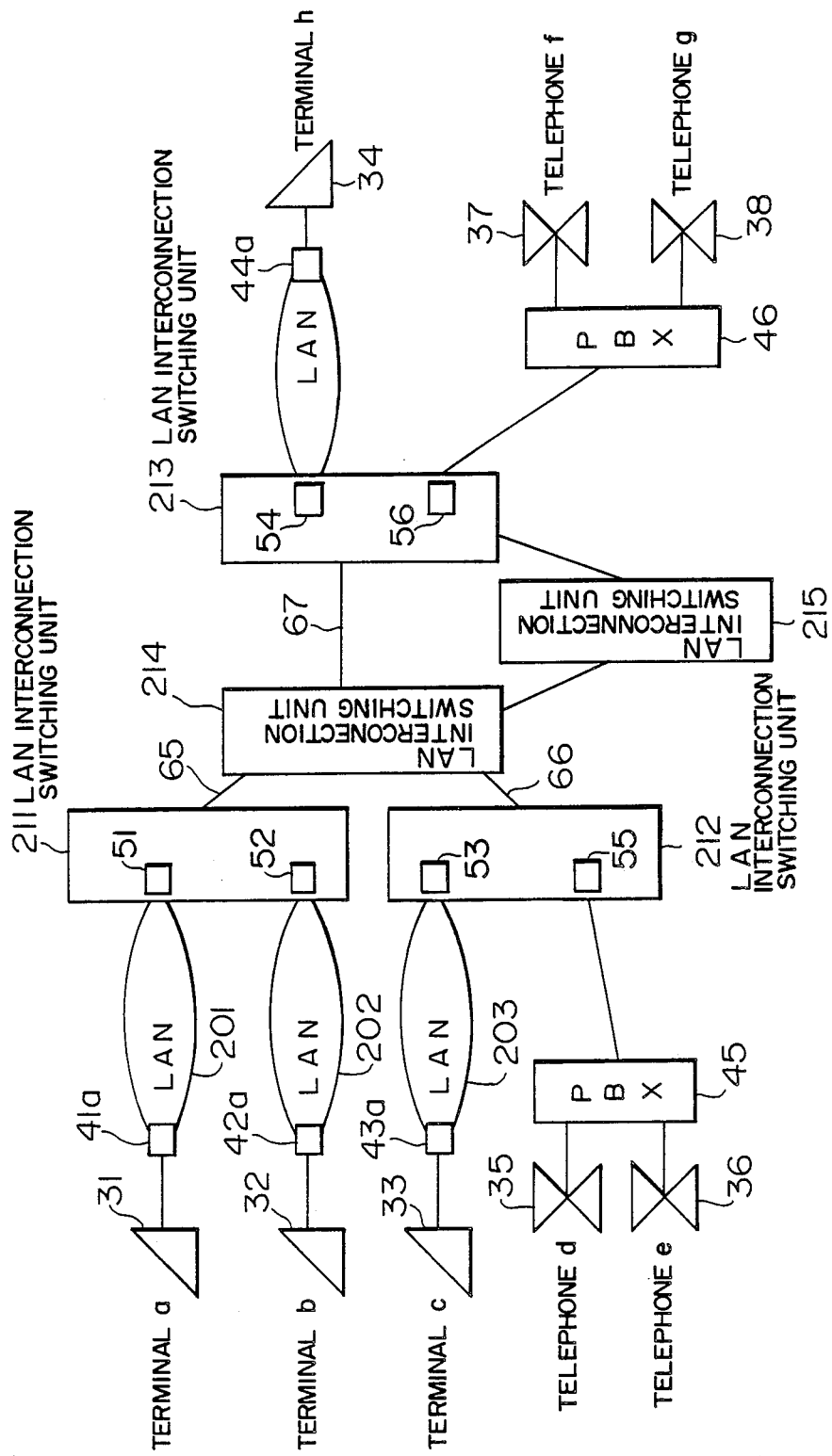
Figure 3:
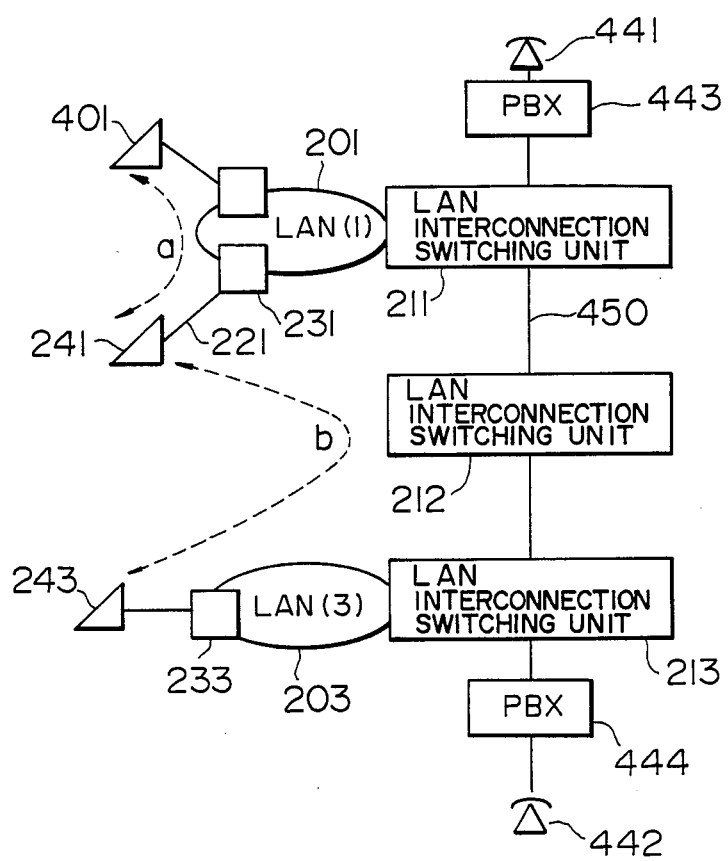

FIGS. 1 to 3 show overall configurations of network systems to which the present invention is applied. In FIG. 1, a plurality of LANs 201, 202, 203 and 204 are interconnected by an interconnection network including LAN interconnection switching units 211, 212, 213 and 214 and relay routes or transmission lines 221, 223 and 224.

A data flow when a terminal 241 accommodated in the LAN(1) 201 through a node 231 and a terminal 243 accommodated in the LAN(3) 203 through a node 233 communicate to each other is now explained.

Where the terminal 241 is a data source station, transmission data is sent to the LAN 201 through the node 231. The LAN interconnection switching unit 211 takes in the received data for switching if its destination is a terminal accommodated in a LAN other than its own LAN. Based on the received data and information in the unit 211, it recognizes that the destination of the data is the terminal 243 accommodated in the LAN 203, and informs relay information (or out-of-band call control information) including a call number to be used for transfer of succeeding data to the LAN interconnection switching units 212 and 213 which are in the relay route in order to establish the route and transfer the data to the destination LAN 203. Then, it sends the received data to the transmission line 221 connected to the LAN interconnection switching unit 212, which relays the data to the LAN interconnection switching unit 213 in accordance with the established route. Then, the data is transferred to the terminal 243 through the LAN interconnection switching unit 213 and the node 233.

In FIG. 2, numerals 211-215 denote LAN interconnection switching units which effect cell switching and statistical multiplexing by using the numbers assigned by the out-of-band call control. Of those, numerals 214 and 215 denote LAN interconnection switching units for relaying. Protocol converters 51-56 for converting the user network protocols to the switching network protocol are connected to the user network LANs 201-204 and the switching units 211-213 which accommodate the LAN nodes 41a-44a and PBXs 45 and 46. The protocol converters may be actually accommodated in the housings of the switching units as portions thereof.

In the present embodiment, data of the LAN terminals 31-34 and voice information of telephone terminals 35-38 are handled, although other media such as packet switching information having the protocol of the CCITT Recommendation X.25 may be accommodated. The type of medium accommodated is not a substance of the present invention.

In FIG. 3 which shows other configuration of the network system to which the present invention is applied, LANs 201 and 203 are ones standardized by the IEEE 802 Committee and they are defined as individual networks relative to the interconnection network, comprising the interconnection switching units 211, 212 and 213. The LAN 201 accommodate LAN terminals 401 and 241 through LAN nodes 411 and 231 which effect the LAN communication protocol. Similarly, the LAN 203 accommodates the LAN terminal 243 through the LAN node 233. The telephone sets 441 and 442 which handle the voice information are also accommodated through the PBXs 443 and 444.

When information is to be switched between the LAN terminal 401 and the LAN terminal 241, it may be switched in the LAN 201. When information is to be transferred from the LAN terminal 241 to the LAN terminal 243, it is the LAN-to-LAN communication between the LAN 201 and the LAN 203 through the transmission line 221 or interconnection network. In this case, the LAN interconnection switching unit 211 is the LAN interconnection switching unit at the transmission station, the interconnection switching unit 212 is the LAN interconnection switching unit for relay connection, and the interconnection switching unit 213 is the LAN interconnection switching unit at the received station. The interconnection switching units at the transmission station and the receiving station have a function to process the MAC (media access control) layers of the LANs 201 and 203 accommodated therein, and a switching function in the interconnection network which is a function of the relay connection switching unit. In the MAC layer, a 4-byte FCS (frame check sequence) is used for error detection. The interconnection switching units 211 and 213 use the FCS to assure the integrity of the information in the interconnection network.

Within the interconnection network data is switched by the frame relaying. The transmission line or interconnection network may be a wide area network (WAN) having a wide coverage area which is much wider than a spatial spread of the LAN.

Figure 4:
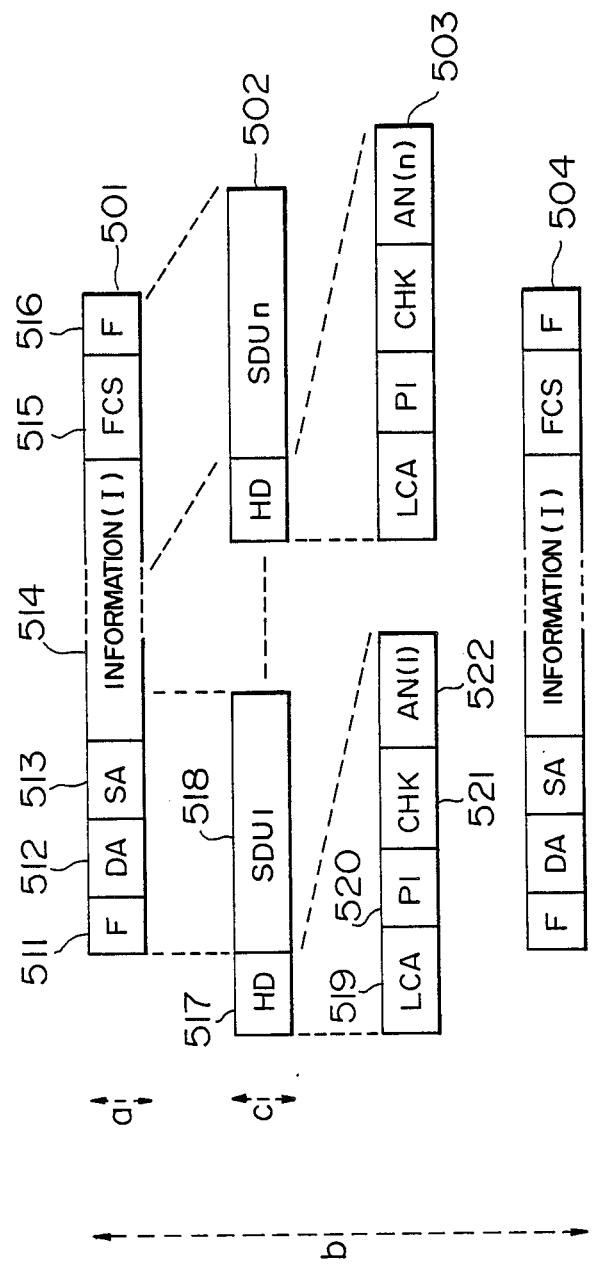
FIGS. 4 and 5 show formats of frames in the present invention.

In FIG. 4, numeral 501 denotes a frame format in the LAN, it shows only major elements. One frame length is usually approximately 4K bytes at most. A 6-byte destination address (DA) 512, a 6-byte source address (SA) 513, an information field (I) 514 and a 4-byte frame check sequence (FCS) 515 are arranged between a 1-byte start flag (F) 511 end a 1-byte and flag (F) 516. This frame format is used in the switching in the LAN of FIGS. 1–3 (for example, the communication a in FIG. 3).

Figure 5:
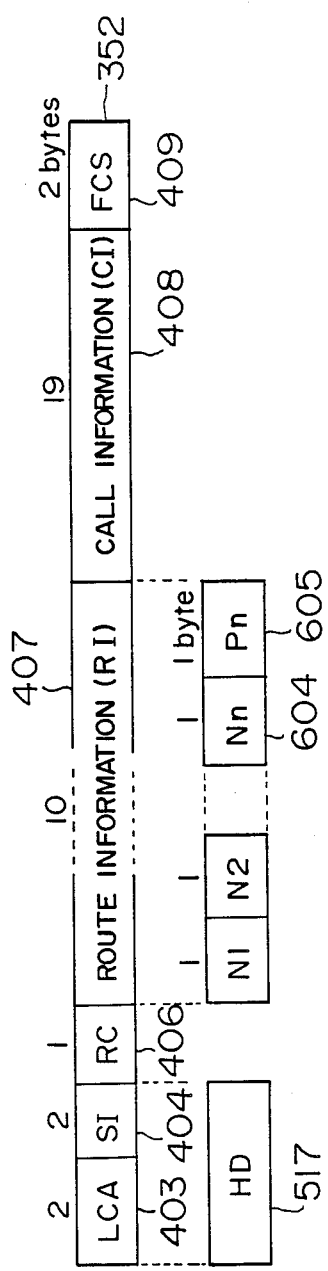

Numeral 502 denotes a frame format in the relay route or transmission line. It comprises a 4-byte header (HD) 517 including information shown in a format 503 to be described later and a 31-byte segmented data unit (SDU) 518. Each of SDU (1−n) 518 is a 31-byte division of the transfer information while the frame content in the LAN is reserved. As shown in the enlarged version 503, the header (HD) 517 a logical channel address (LCA) or call number 519 which can uniquely specify a destination LAN and a relay route and which is assigned to a communicating LAN terminal pair, a packet identification (PI) for indicating a type of packet such as packetized voice or data packet, error detection information (CHK) for the LCA 519 and the PI 520, and a segmentation number (AN) 522. An information occupancy rate in the frame 502 of FIG. 4 is represented by (36−4)/36=88.9%. If route information (RI) and RI control information of FIG. 5 are included in the frame, it is (36−(11+4))/36=58.3%. Accordingly, the present invention provides a significant improvement. Where the transfer information is the voice information, the voice information is written into the SDU 518 and information occurrence time which is usually called a time stamp is written into the AN 522. The call control information is also transferred by the SDU 518. The error detection information 521 detects errors in the LCA 519 and the PI 520 or only in the LCA 519 and it does not detect errors in the entire data content. The frame format 502 is used in the communication (b) in the interconnection network of FIG. 3.

Numeral 504 denotes a frame format in the destination LAN which is reassembled from the frame format in the interconnection route, and it is identical to the frame format 501 in the source LAN. Each of the segmentation numbers AN(1) to AN(n) of the segmented data comprises a 1-bit last identifier which indicates last segmented information or more data bit M (when M="1", it indicates that a succeeding segmented cell generated from the same user data is present) and a 7-bit serial number. It can sequence up to 3968 (=31×128) - byte transfer data.

Figure 6:
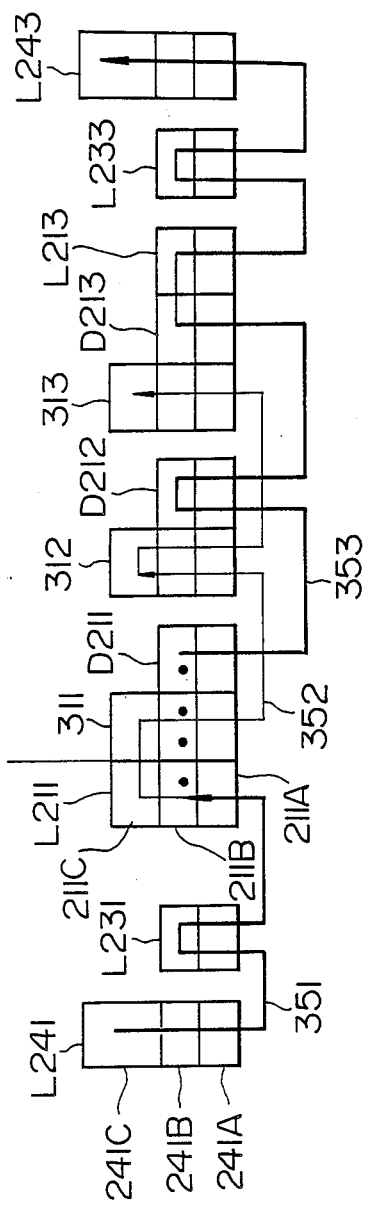
FIG. 6 shows a protocol in a LAN interconnection switching unit of the present invention.

Referring to FIGS. 5 and 6, call setting-up or establishment of route by the LAN interconnection switching unit prior to the data transfer is explained. FIG. 6 shows protocol stacks of the units between the terminals 241–243 of the networks of FIGS. 1–3. The protocol stacks are compatible with the OSI reference mode protocol stacks. A protocol stack L241 has the protocol of the source LAN terminal (for example, 241 in FIG. 1) and it is identical to a protocol stack L243 of the destination LAN terminal (for example, 243 in FIG. 1). The protocol stack L241 comprises a physical layer 241A, a MAC layer 241B and upper layers 241C. Each of the units of FIGS. 1–3 has the same or corresponding layers. Thick lines 351 and 353 shown in FIG. 6 show data flows, and a thin line 352 shows a flow of transfer of call set-up information for establishing the route between the LAN interconnection switching units. The data 351 generated in the LAN terminal 241 reaches the LAN protocol stack L211 in the unit 211 through the protocol stack L231 of the node 231 in the LAN. The two low layers 211A and 211B of the protocol stacks L231 and L211 are identical to the two low layers 241A and 241B of the protocol stack L241. The unit 211 recognizes by the MAC layer 211B that the received data is the LAN-to-LAN transfer data based on the MAC layer destination address (512 in FIG. 4) in the received data. The unit 211 determines a route to send the data to the destination terminal, by the call set-up layer 211C by referencing a preset routing table to be described later. When the route is determined, the call set-up layer 311 outputs call set-up information 352 including route information and call information (call number) which is effective in the LAN interconnection units. Whether the call number is different from LAN interconnection unit to unit is not a substantial matter. The call set-up information 352 is received by the call set-up layer 312 in the LAN interconnection switching unit 212 and a relay table necessary in the succeeding data relay stage is prepared. The received data is then sent to the next LAN interconnection switching unit 213. Thus, the relay route is established. The layer 313 is a call set-up layer of the interconnection switching unit 213. The call set-up layers 311–313 have the identical structure.

In this manner, the call number (LCA) and the route are set up.

After the LAN interconnection switching unit 211 has sent the call set-up information 352 to the unit 212 (the format thereof will be described later in connection with FIG. 5), it transfers the received data to the unit 212 in the form of the call set-up information with the call number attached thereto. The data transfer is effected by the data transfer layer D211. The protocol stacks D212 and D213 are transfer layers in the units 212 and 213, respectively, and they have the identical structure. The transfer data 353 received by the unit 212 is transferred to the unit 213 in accordance with the relay table prepared in the call set-up layer 312. The unit 213 has already received the call set-up information 352 and it determines that the destination of the received data (502 in FIG. 4) from the unit 212 is the terminal accommodated in the LAN 203 and sends the received data to the LAN 203. The two low layers of the protocol stacks L213, L233 and L243 are identical to the two low layers 241A and 241B of the protocol stack L241.

FIG. 5 shows a format of the call set-up information 352.

The call set-up information 352 comprises a call number (LCA) 403 which is effective to the adjacent downstream LAN interconnection switching unit, service information (SI) 404 including a type of error check bit information for the call number and a type of medium, LAN interconnection switching unit address sequence (RI) 407 which indicates the relay route or route information, RI control information (RC), call information (CI) 408 and error detection (FCS) 409. The LCA 403 and the SI 404 are header (HD) 517. A value, for example, "0" to indicate the call set-up frame is set to the LCA 403 of the call set-up frame or call set-up information, and the call number is assigned as an identification to the call to be set up and it is set into the call information (CI) (for example, by 2-byte numeric). This call number is set to the head LCA of the succeeding segmented transfer data 503 and it is correlated to the previously determined transfer route.

When a response to the control information is sent back from the interconnection switching unit 233 which accommodates the destination terminal, the interconnection switching unit 211 receives the response and send the LAN data 353 (FIG. 6) in the cell form.

Figure 7:
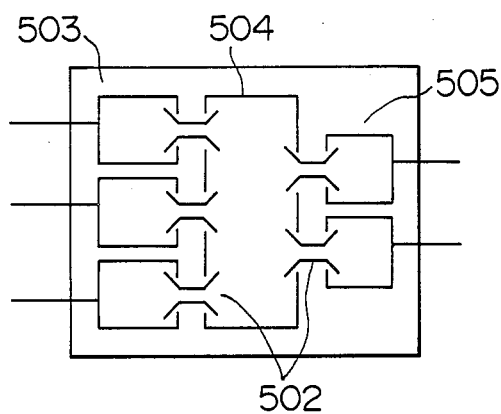

FIG. 7 shows a conceptual configuration of the LAN interconnection switching unit 211 (or 212–214). The unit 211 comprises a medium unit 503 which accommodate an individual LAN, a link unit 505 which accommodates a transmission line or LAN interconnection network, and a common unit 504 which interconnects the above units to switch data. Each LAN interconnection switching unit is assigned with an identifier to identify the unit, and a port identifier is assigned to a connection point or port 502 between the medium unit 503 and the link unit 505, and the common unit 504.

FIG. 8 shows a type of table in the LAN interconnection switching unit, information in the table and an information length. The medium unit 503 of FIG. 7 contains three tables T1–T3. A filtering table T1 contains, in an ascending order, the LAN terminal addresses 601 in the LAN to which the medium unit 503 is connected. The medium unit 503 compares the destination address of the received data with the addresses in the filtering table, and if there is no matching address, it regards the received data as the LAN-to-LAN transfer data and processes it in the manner described later. On the other hand, if the addresses are matched, it regards the received data as the data to be sent to the terminal accommodated in the same LAN and relays it.

A line table T2 comprises terminal addresses 602 in the individual LANs accommodated in the distant LAN interconnection switching unit, that is, the LAN 202, 203 or 204 when viewed from the LAN interconnection switching unit 211 of FIG. 1, an output port identifier 603 in its own LAN interconnection switching unit, an identifier train 604 of the LAN interconnection switching unit for relaying the data to the destination terminal, and a port identifier 605 of the medium unit of the last LAN interconnection switching unit connected to the LAN which accommodates the destination terminal.

A set-up call table T3 contains information for the set-up calls. It comprises addresses 606 of the source terminals listed in an ascending order, addresses 607 of the corresponding destination terminals, an output call number (LCA) 608 assigned at the time of call set-up, and an output port identifier 603. When the medium unit receives the data from the LAN, it looks up to set-up call table T3. If a communication pair corresponding to the destination/source addresses in the data is present in the table, a predetermined output LCA 608 is assigned to the data and it is supplied to the port specified by the output port identifier 603'. If the above communication pair has not been set up, the routing table T2 is referred to set up to call or prepare the table T3, and then the data is transferred.

Three tables T4–T6 in the link unit are now explained.

A relay table T4 contains relay information prepared based on the call set-up information sent by the station which set up the call. It comprises an input LCA 610, an output LCA 612, and an output port identifier 603". The output LCA 612 is provided with an unused output LCA 612' in an output call table T5 when the call is set up in the relaying interconnection switching unit. The output port identifier 603" is determined by a LAN interconnection switching unit identifier Nm 604 in the call set-up information and a structure table T6.

The input port identifier 615 of the output call table T5 indicates the port identifier in the same LAN interconnection switching unit which is the input terminal of the call to which the output LCA has been assigned, and an input port use LCA 616 indicates the LCA which has been assigned in the preceding stage link. By referring the output call table T5, an upstream LAN interconnection switching unit can be identified from a downstream LAN interconnection switching unit.

FIG. 9 shows a detailed block diagram of the LAN interconnection switching unit 211. Thick lines indicate data flows. The data 201 received from an individual LAN is supplied to a LAN access unit 2101 which checks a validity of frame in accordance with a MAC layer protocol of the LAN. Then, the filtering table T1 of FIG. 8 checks whether the received data is the LAN-to-LAN transfer data or the inter-LAN transfer data. If it is the LAN-to-LAN transfer data, the received data is transferred (2152) to an information generation unit (2103) and a call set-up unit 2102 is activated (2151). The call set-up unit 2102 has the filtering table T2 and the set-up call table T3. The set-up call table is first looked up to check set/non-set of the call. If it has been set up, an instruction for data transfer and the transfer information are sent (2153) to the information generation unit 2103. On the other hand, if it has not been set up, the set-up call table T3 is prepared and an instruction to send the call control information, the call number and the route information are transferred (2154) to a control generation unit 2104. The subsequent process is similar to that for the set-up call.

A selection unit 2105 selects the call control information output 2156 or the data transfer output 2157 in accordance with an instruction (2115) of the call set-up unit 2102, and supplies (2158) it to a transmission switching unit 2106. The transmission switching unit 2106 switches the transfer data or the call control information in accordance with the output port identifier 603 or 603', and supplies (2159) it to a transmission unit 2107, which transmits the data to the transmission line 221(a) of the interconnection network.

A receiving unit 2108 processes the data received from the transmission line 221(b) to send the call control information having LCA="0" to a call control unit 2109 having the relay table T4, and the transfer data having LCA=call number≠"0" to a received switching unit 2110. The received switching unit 2110 determines whether the transfer data is the relay data 2161 or the end data 2162 in accordance with a control signal 2160 generated by the call control unit 2109 and the relay table T4, and transfers the relay data to an information relay unit 2111 and the end data to an information received unit 2112 corresponding to the last output port identification.

The call control unit 2109 prepares the relay table T4 based on the call set-up information and activates a control reassemble unit 2113 to send the call set-up information to the succeeding stage LAN interconnection switching unit.

The call control unit 2109 may activate the control generation unit 2104 for traffic control and flow control to generate new control information.

In the present embodiment, the table look-up time may be reduced by storing the filtering table T1, the routing table T2 and the set-up call table T3 shown in FIG. 8 in the ascending order of the LAN terminals. In the present embodiment, all LAN interconnection switching units have the same function, although the functions may be shared by the call set-up station and the relay station (the units 74 and 75 in FIG. 2 merely relay). In this case, the LAN interconnection switching unit which functions as the relay station does not require the filtering table T1, the routing table T2 and the set-up table T3 of the medium unit. In the present invention, the LAN interconnection switching unit may be connected to the conventional X.25 network by activating the call set-up unit of FIG. 9 by the call set-up notice (CR) of the CCITT Recommendation X.25.

Another embodiment of the present invention is now explained with reference to FIGS. 10–12.

In the interconnection network, information of different nature such as in traffic distribution and necessary transfer time, for example, computer data and telephone voice information are usually transferred in the same procedure and by packet multiplexing over one transmission line.

In order to realize a multi-media network which can rapidly process all kinds of information, when the voice information is to be transferred in packet, it is advantageous to use a short packet of several tensbyte fixed length in the interconnection network in order to avoid degradation of the voice quality due to the transfer delay. In the real time transfer of the telephone voice information, a shorter transfer delay (speech delay) than that of the computer data is required and hence the short packet is needed instead of a long packet.

However, if the short packet is used in the prior art system in which the transmission line or interconnection network adds unique error detection information, the error detection information is added to each of the short packets used in the interconnection network. As a result, a ratio of the information length to the packet length is reduced and the information transfer efficiency is lowered.

On the other hand, since the voice information has more redundancy than the computer data, the voice quality is not degraded even if a portion of the packet drops. Because of a trend of reduction of an error rate in the interconnection network due to the recent use of an optical fiber, there is a trend that the error check is not effected in the interconnection network. (Only the packet header is checked for an error in the packet.) Such a packet format is discussed by the CCITT SG XVIII working Group for ATM/asynchronous transfer mode). However, because no error check is effected in the interconnection network, a data reliability to the users may be lost.

In the interconnection network, a several tens-byte cell is usually used. Assuming that the packet length in the interconnection network is of 32 byte length and 4 byte thereof are used for the FCS (frame check sequence) of the CCITT, the transfer deficiency lower by 12.5% (=4/32).

Figure 10:
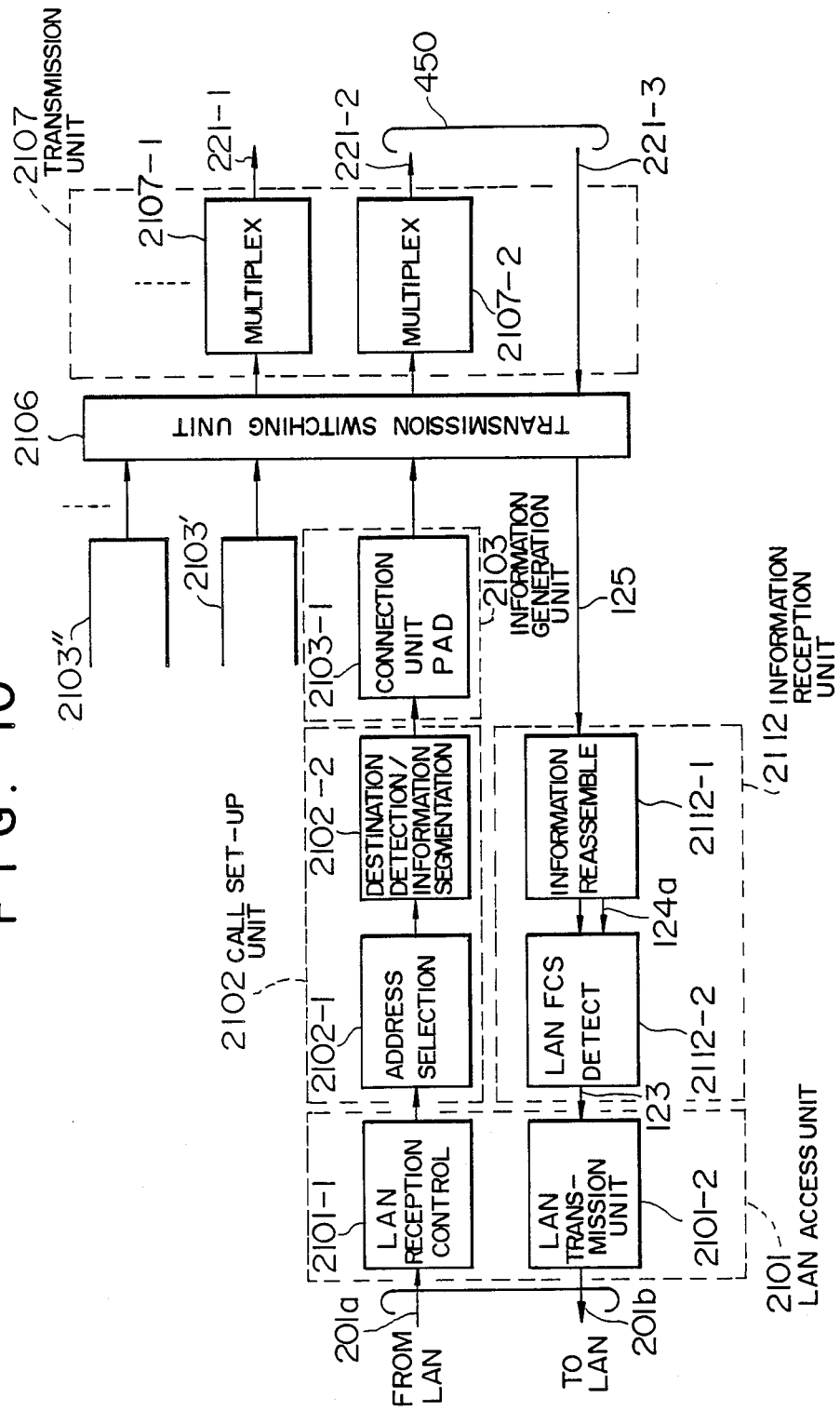
FIGS. 10 to 14 show a LAN interconnection unit of the LAN interconnection switching unit of the present invention and operation thereof.

FIG. 10 shows a functional block diagram of a transmission terminal and a received terminal of the interconnection switching unit. Information 201a received from a LAN has the frame format 501 shown in FIG. 4. This frame format is supplied to a LAN received control unit 2101-1 which processes a MAC layer protocol of the LAN such as FCS check so that a validity of the frame is checked. Then, an address selection unit 2102-1 determines whether the received information from the LAN is an inter-LAN information or a LAN-to-LAN transfer information. Only if it is the LAN-to-LAN transfer information, it is transferred to the succeeding stage interconnection switching unit.

The address selection may be attained by comparing the destination address (DA) of the received information with the LAN terminal addresses (in its own interconnection switching unit) which have been preset in the address selection unit.

A destination determination/information segmentation unit 2101-2 determines, as a first function thereof, the transmission terminal interconnection switching unit to which the destination LAN is connected and a relay interconnection switching unit reaching to the above unit, based on the destination address (DA) in the received information. The call number LCA 519 shown in FIG. 4 is assigned to the logical communication path, and the interconnection unit or packet assembly and reassembly unit (PAD) 2103-1 is instructed to inform the relay route and the LCA to the relay interconnection switching unit by the frame format 502 of FIG. 4. The LCA of FIG. 4 indicates that the transmission packet from 121 is a notice packet. This packet is prepared by the interconnection unit PAD 2103-1.

The second function of the destination determination/information segmentation unit 2102-2 is to segment the transfer information, after the notice packet has been sent, into 31-byte transfer information 518 and assign the segmentation numbers (AN) 522. Then, they are assembled to the packets of the frame format 502 by the interconnection unit (PAD) 2103-1 and they are sent to a switch 2106. The switch 2106 includes a buffer and receives the packets from other similar interconnection units (PAD) 2103' and 2103" and rearrange them by destination. Then, it sends them to the multiplex units 2107-1 and 2107-2 for the respective destinations. The multiplex units 2107-1 and 2107-2 multiplex them such that the packets in the same direction are supplied to the same output line 221-1 or 221-2. In this manner, the packet multiplexing is effected.

On the other hand, of the packets of the frame format 502 received from the input line 221-3, those packets to be relayed are sent to the succeeding stage interconnection switching unit by the switch 2106 through the output line 221.

The received packet to be sent to the LAN is sent to the information assemble unit 2112-1, which includes a memory for storing the received packet, switching frame by frame, and a detector for detecting whether the packet is last information of the switching frame. The header (HD) 517 is removed by the information assemble unit, and it is divided by LCA, and the sequence check and the last information check are performed based on the segmentation number (AN) for each LCA. The check may be attained by the comparison of the segmentation number and the count of the counter which is incremented each time the packet having the same LCA is received.

A LAN FCS unit 2112-2 generates new error detection information (FCS information) based on the transfer information of each LCA by using the error detection technique in the source LAN, compares the generated FCS information with the received FCS information, and issues a transfer data transmission request signal 123 to a LAN transmission control unit 2102-2 in response to the last information received signal from the information assemble unit 2112-1. The LAN transmission control unit 2102-2 acquires a LAN access right, controls release and sends information associated with the acquisition of the access right.

Figure 11:
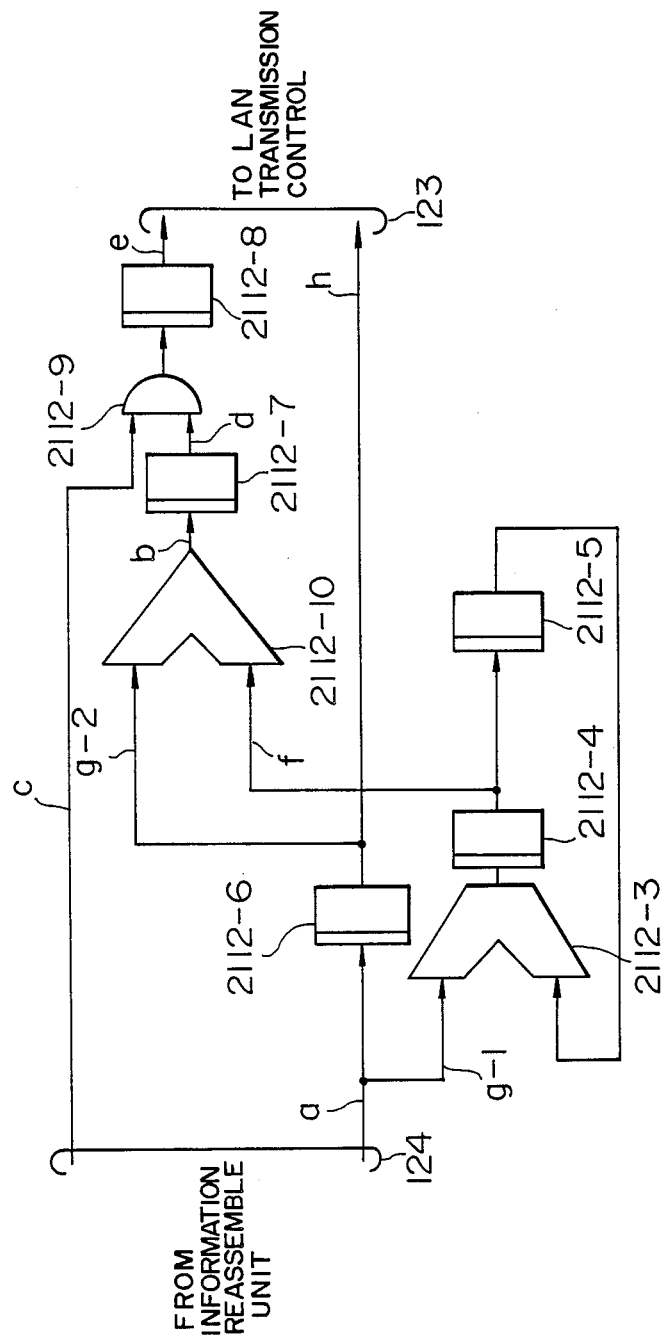
Figure 12:
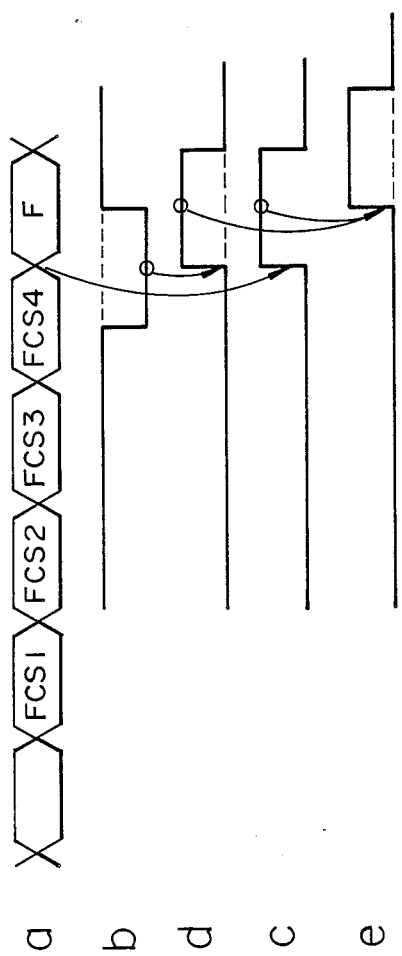

FIGS. 11 and 12 shows an error detection circuit which is a major circuit of a LAN FCS discrimination unit 2112-2 and a timing chart of waveforms in the circuit.

A signal a is transfer information received from the information assemble unit 2112-1, and a signal b is an output of a comparator 2112-10 which compares an output which is new error detection information generated by an FCS arithmetic and logic circuit 2112-3 connected to latches 2112-4 and 2112-5, based on a switching frame error detection information g-1 in the signal a with the received switching frame error detection information g-2.

A signal c is a last information signal from the information assemble unit 2112-1. A transfer data transmission request signal e is a logical AND 2112-9 of the signal c and a signal d. Latch circuits 2112-4 to 2112-8 are temporary stores to match phases. In the circuit of FIG. 11, a transmission request to LAN is generated by a logical AND of the result of the FCS check (signal b) and the reception of the end packet (signal c).

A solid line for the signal b in FIG. 12 show a signal produced when two error detection information (both inputs to the comparator 2112-10) are equal (that is, no error). When there is no error, the transfer data transmission request signal e is logical "1" because of the signals d and c to activate the LAN transmission control function.

In accordance with the present invention, since the cell (for example, 36 bytes) is used as the transfer frame format in the interconnection network, it is possible to accommodate the packetized voice which is to be transferred real time in the same transfer procedure as that of data from various terminals. In order to improve the sound quality which is real time transmitted, it is necessary to reduce the delay as much as possible. By using the cell, the packetized voice can be immediately inserted at any position in the data packet so that the voice transfer without delay is attained. In the packetized voice, because a resistance to the information error is high (the degradation of quality is very little even if a portion of the packetized voice drops), the information error is not usually detected in the interconnection network. For the data, since an affect by or degradation of quality due to the information error is large, the error detection function is required. In accordance with the present embodiment which detects the error in the interconnection network by using the individual network error detection method, the request for error detection which differs from medium to medium can be readily satisfied.

In the present embodiment, since the error in the interconnection network can be detected without newly adding the detection information in the transmission line or interconnection network, the transfer efficiency can be improved by 10–20% in the multi-media packet network which accommodates the packetized voice.

Figure 13:
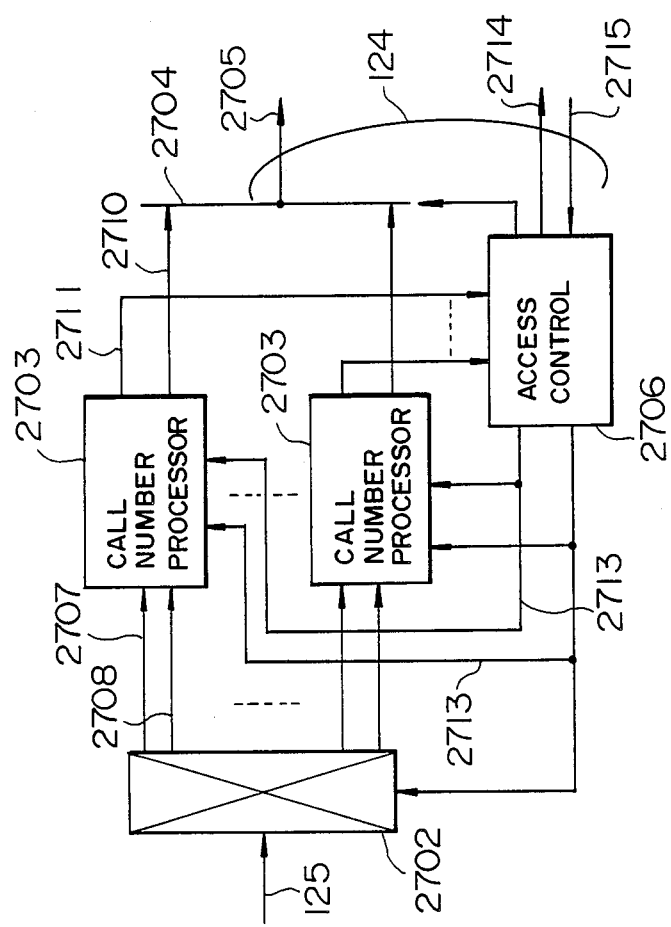

FIG. 13 shows a detailed logical configuration of information assembling for reproducing a cell from a frame 125 received from the transmission line.

As shown in FIG. 13, the information assemble unit 2112-1 comprises a logical call number switch 2702, a logical call number processor 2703 and a LAN access controller 2706.

The frames 125 received from the transmission line are selected for each call number LCA by the logical call number switch 2702 and stored in logical call number processors 2703 provided one for each call number.

The logical call number switch 2702 produces an identical LCA cell train 2708 (thick line) and last cell information 2707 (thin line). When the logical call number processor 2703 receives the last cell information 2708, it supplies a user data reassemble end signal 2711 to the LAN access controller 2706. When the LAN access controller 206 receives the user data reassemble end signal 2711, it sends a transmission request signal 2714 to the LAN access unit 2101 and controls the selector 2704 and controls the read/write operations of the logical call number processor 2703 through control signals 2712 and 2713 by the transmission end signal 2715 from the LAN access unit 2101. The signal 2710 represents the result of processing by the logical call number processor 2703. An output selected by the selector 2704 is sent out.

Figure 14:
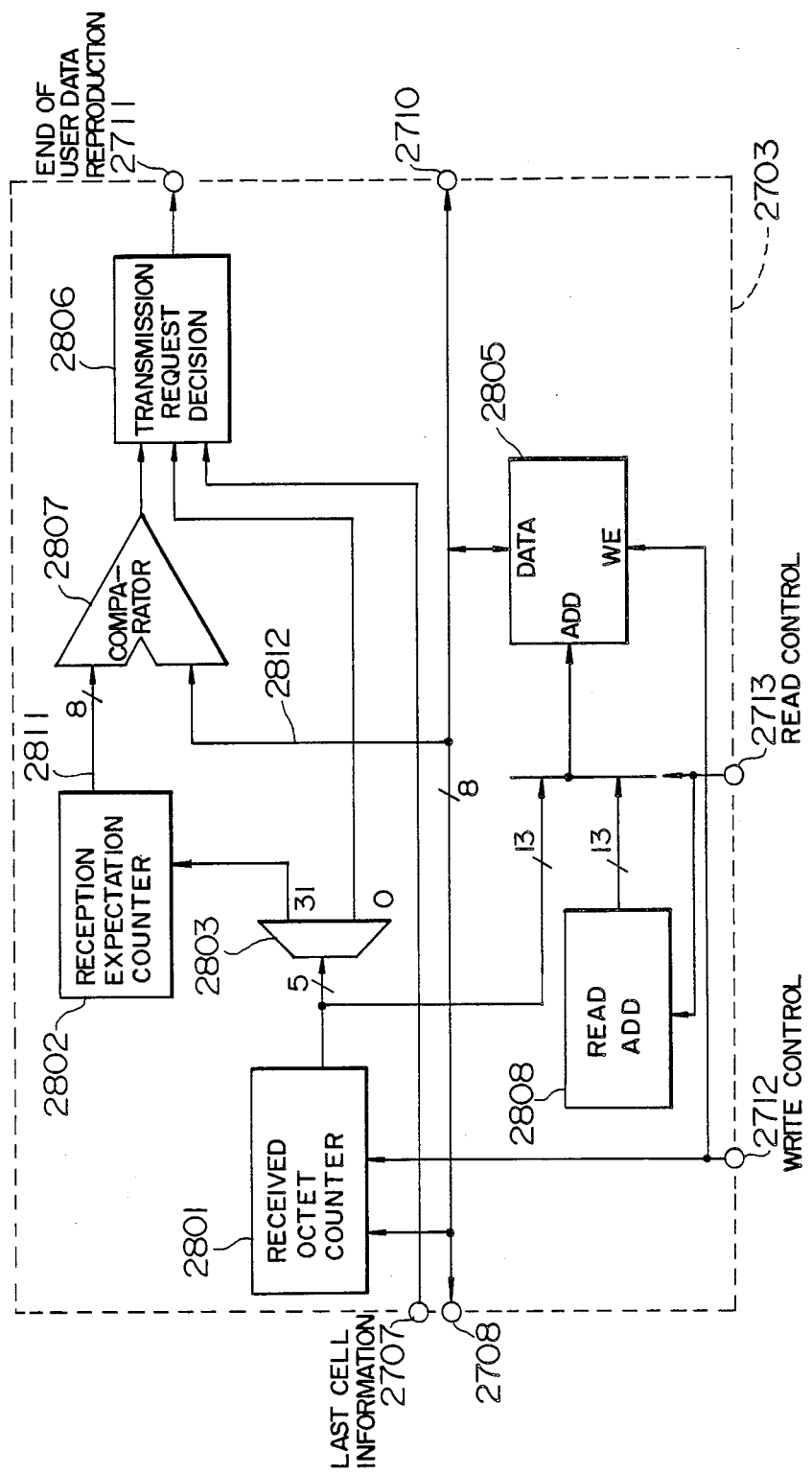

FIG. 14 shows a detailed logical configuration of the logical call number processor 2703 of FIG. 13.

A received octet counter 2801 of the logical call number processor 2703 counts an input cell length in accordance with a write control signal 2712 from the LAN access controller 2706. The count is decoded by a decoder 2803, and when the count reaches "31", a expected reception (SN) counter 2802 is incremented by one. Each time 32 bytes (cell length) are counted, the counter is incremented to count the number of cells. An output 2811 of the expected reception (SN) counter 2802 and AN 522 of the received cell are compared by a comparator 2807. When an output of the comparator, the output "0" of the decoder 2803 and the last cell information 2707 are all "1", a user data reassemble end signal 2711 is supplied to the LAN access controller 2706. Thus, the transmission request is issued to the LAN access controller 2706 and the LAN access unit 2101.

The input data 2708 is supplied to a buffer memory 2805. The output of the received octet counter 2801 is used as an address to store into the buffer memory 2805, and a write control signal 2712 from the LAN access controller 2706 is used as a write enable (WE) signal. When data is read from the buffer memory 2805, a read address register 2808 is controlled by a read control signal 2713 from the LAN access controller 2706 and uses the output thereof as a read address.

In the present embodiment, since the continuous switching control of the consecutive cells is effected by the LCA filter, the spatial switch may be any switch such as matrix switch, bus switch or Banyan switch.

When an error occurs in the ATM network, the error cell is discarded, when at least one cell drops in the reassemble of the user frame, the user frame is invalidated and discarded. Then, the drop of the user frame is detected by a high order protocol on the terminal and the data is retransmitted. A burst error usually occurs on the transmission line. Where the data is multiplexed user frame by user frame as is the case of the present invention, the number of user frames which are discarded by probability statistics reduces and the means delay time by the retransmission is reduced as a whole.

Figure 15:
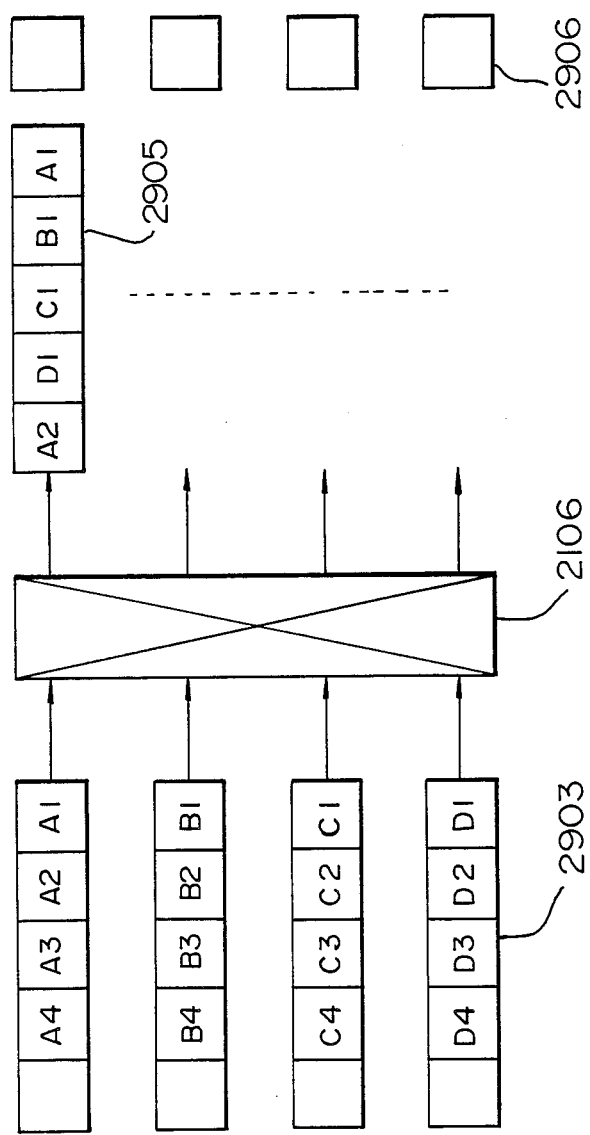
FIG. 15 shows a conceptual view in a process of a cell switching method in the LAN interconnection switching unit of the present invention.

The cell switching system in the transmission switching unit 2106 shown in FIG. 9 is now discussed. In FIG. 15 which shows a specific example of cell switching, the cell length is 16-byte length and the number of input-/output lines is 16. Accordingly, the cell train used by 16 users may be inputted to the switching unit. An input circuit thereof has a serial-to-parallel converter (not shown). The input serial cells for the respective users (A1, A2, ..., B1, B2, ..., C1, C2, ..., D1, D2, ...) 2903 are 8-bit serial-to-parallel converted by the converter. Since the input cells to the serial-to-parallel converter have different phases for the respective 16 input lines, the phases are adjusted such that the head bytes of the cells on the input liens are sequentially staggered by one byte. That is, the cell B1 is retarded from the cell A1 by one byte, the cell C1 is retarded from the cell B1 by one byte and the cell D1 is retarded from the cell C1 by one byte, and they are supplied to the serial-to-parallel converter. The cells are switched in the order of their arrival and multiplexed on the switching output line. The multiplexed cell train is outputted in the sequence of A1, B1, C1, D1, A2, B2, C2, D2, A3, ..... as shown in FIG. 15. This cell train is sent out to the specific path X and a cell train which is not shown in sent out to the other path Y.

In the present system, when cells simultaneously arrives at the input lines of the cell switch, the switching is effected in the order of input lines. Looking at adjacent cells on one input line (for example, A1 and A2 in FIG. 15), the succeeding cell A2 is switched at the 16th run, after the preceding cell A2 has been switched. The cell trains A-P from the 16 users are supplied to the 16 input lines and the phases thereof are sequentially staggered by one byte by the phase adjuster, accordingly, when the are switched and multiplexed and if they are to be sent out to the same path, the 16 bytes A2-P2 have been arranged. This means that 15 cells from other input lines exist between A1 and A2 on the output line. In the ATM switching unit which accommodates the LAN, the LAN is connected to one input line of the cell switch in the switching unit.

As described above, the LAN frame is of variable length up to 4 k bytes, and it is divided at the connection unit into shorter lengths which can be transferred by the cell. In the present example, it is divided into 125 (=4000/32) cells.

On the other hand, in the ATM switching unit which accommodates the destination LAN of the LAN frame, the cells generated from the same LAN frame are buffered and the LAN frame is reproduced by checking the positions of the cells in the original LAN frame by the serial numbers assigned to the cells, and the reproduced LAN frame is transferred to the destination LAN. Referring to FIG. 15, the cells are switched by the switching unit 2106 and multiplexed in the sequence of A1, B1, C1, ... A2, B2, C2, .... In order to deliver them to the destination LAN, it is necessary to rearrange them to the original sequence A1, A2, A3, ..., B1, B2, B3, ... , C1, C2, C3, ... to reassemble the LAN frame. If they are not multiplexed, A1-A4 may be buffered and then B1-B4 may be buffered in another buffer while A1-A4 are transferred to the destination. Thus, only two buffers are required and they are used alternately. However, when they are multiplexed as shown in FIG. 15, as many buffer memories 2906 as the number of concurrently inputted LANs are required.

It is assumed that one ATM switching unit accommodate 16 LANs. In the prior art system, since the cells from the 16 paths are sequentially multiplexed on the output line, the destination ATM switching unit need 16 buffer memories to reassemble the LAN frame. The check of the serial numbers of cells is also complex and this leads to the increase of hardware.

Figure 16:
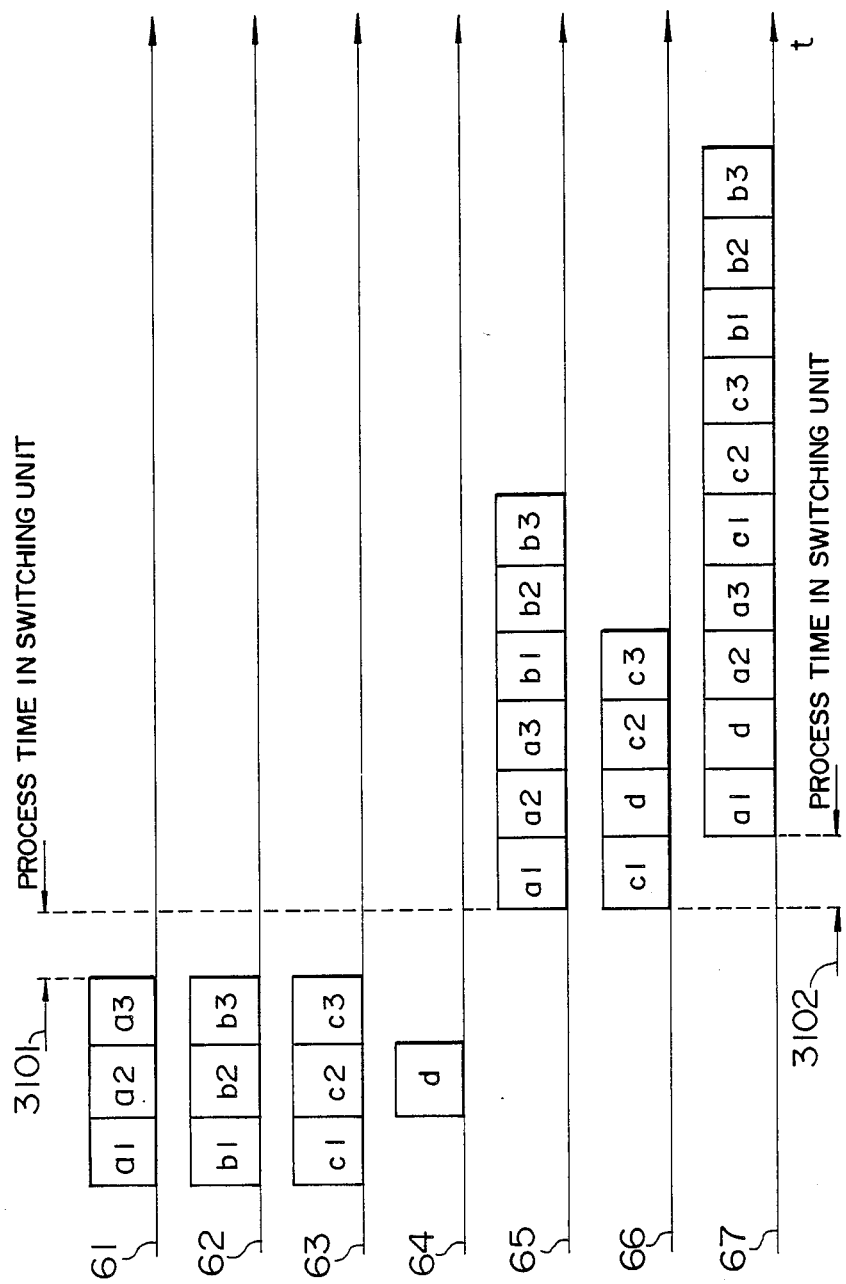

FIG. 16 shows an operation time chart of the cell switching system in accordance with one embodiment of the present invention.

In FIG. 16, the signal time chart of the signal lines 61-67 of FIG. 2 is shown. An abscissa represents a time t, and an ordinate represents cell arrangement on the signal lines. The time t increases as it goes from left to right. Since the signal lines 61-67 are behind the protocol conversion units 51-55, the information blocks represent the cells. The information generated by the terminals 31, 32 and 33 are transmitted to the signal lines 61, 62 and 63 in the cell format (in the order of a1, a2, a3; b1, b2, b3; and c1, c2, c3; respectively). The cell d including the voice information generated in the telephone terminal 35 and switched by the PBX exists on the signal line 64. The symbols a, b, c, d, ... shown the cells represent the logical call numbers, and the numerals 1, 2, 3, ... attached thereto represent the division numbers. In the cells a3, b3, c3 and d, the more data (M) bits are "0", and in other cells, the more data bits are "1". This indicates that there is no succeeding cell generated from the same user data, in the cells a3, b3, c3 and d, and there are succeeding cells generated from the same user data, in the other cells a1, a2, b1, b2, c1, c2.

In the switching interconnection unit 211, the cell a1 on the signal line 61 is switched. Since M of the cell a1 is "1" and M of the cell b1 is also "1", the cell a2 is successively switched. Since M of the cell a3 is "0", the cell b1 is next switched. In this manner, the order of switching is determined and the switched cells are multiplexed.

Figure 17:
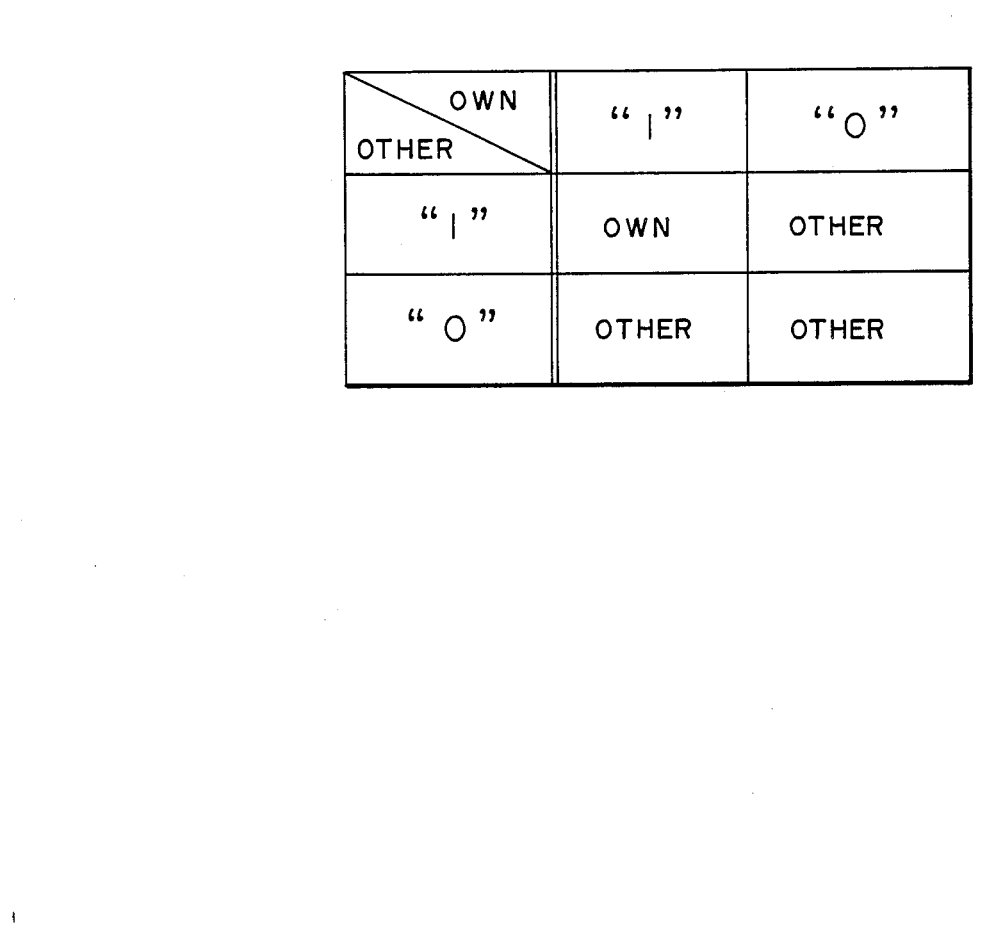

FIG. 17 shows a procedure to determine the order of switching in the present invention.

In FIG. 17, an abscissa represents values of the more data (M) bits of its own cell and an ordinate represents values of the more data (M) bits of other cells. A cell at a crosspoint indicates the cell to be switched under that condition. For example, if the cell of its own is "1", it means that the cell generated from the same LAN frame follows, and the cell of its own is switched except when other cell is "0". If the cell of its own is "0", it means that the cell generated from the same LAN frame does not follow and the cell of its own is the last one, and the other cell is switched. As a result, the cell of its own is switched when the more data (M) bit of the cell of its own is "1" and the more data (M) bit of the other cell is "1". In other cases, other cell is switched. In this manner, the delay of data is reduced.

Rules for the switching are:
(i) If both are "1", own cell has a priority.
(ii) If own cell is "0" and other cell is present, other cell is switched.
(iii) If own cell is "1" and other cell is "0", other cell is switched.

In FIG. 16, the cells a1-a3 and b1-b3 are multiplexed in this order on the signal line 25 in accordance with the above principle of switching sequence.

In the interconnection switching unit 712 (FIG. 2), the cell c1 on the signal line 63 is switched. Since the M of c1 is "1" and the M of d is "0", the cell d is next switched. Thereafter, the cells c2 and c3 are switched. Accordingly, the cells c1 d, c2 and c3 are multiplexed in this order on the signal line 66, as shown in FIG. 16.

Further, in the relay switching unit 214, the input cells from the signal lines 65 and 66 are switched. The cell a1 is switched first. Since the cell number of the cell c1 is different and the M of the cell d is "0", the cell d is switched next. Thereafter, the cells a2 and a3 are sequentially switched. After the cell a3 having M="0", the cell c1 is switched. In 16, numeral 101 represents a process time in the switching unit 211, and numeral 3102 represents a process time in the switching unit 214.

In this manner, the multiplexed cell trains on the line 67 of FIG. 16 are sent out to the output relay line 67 of the relay switching unit 214 of FIG. 2.

Figure 18:
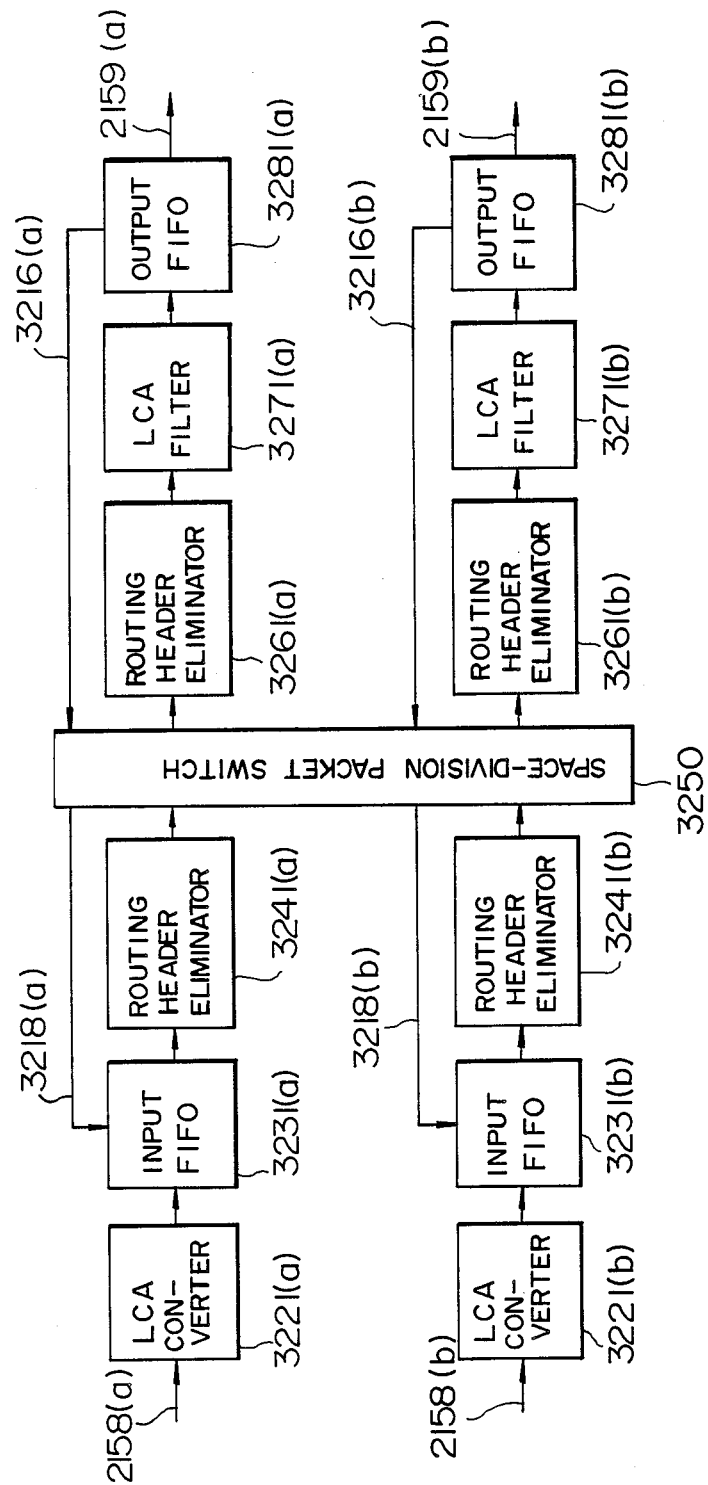

FIG. 18 shows a detailed block diagram of the transmission switching unit of FIG. 9. In FIG. 9, the LAN frame sent from the LAN is divided into cells and they are supplied to the spatial switch 50 through the signal line 2158(a) where they are switched and sent to the signal 2159(a) of the destination LAN. On the other hand, the multiplexed cell trains sent from the signal line 2158(b) of the opposite direction destination LAN, are switched by the spatial switch 50 and reproduced to the LAN frame, which is sent to the LAN through the LAN access unit 2101.

In FIG. 18, the opposite directions are shown as the same direction. In the consecutively arriving cells, the cell having other LCA and M="1" is not switched until the cell having the same LCA and M="0" is switched.

The cells supplied from the input lines 2158 are LCA-converted by the LCA converters 3221 and they are stored in the input FIFO (first in first-out) 3231. Routing headers corresponding to the output lines 2159 are added by the routing header applicator 3241 in accordance with the LCAs of the cells, and they are supplied to the corresponding output lines through the spatial switch 3250. When two cells are to be sent to the same output line, only one of them is sent and the other is discarded. The routing header of the cell supplied from the spatial switch 3250 is eliminated by a routing header eliminator 3261, and it is filtered in an LCA filter 3271 by the LCA and the M bit. The cell outputted from the filter is stored in the output FIFO 3281. If the cell now reaches the output FIFO 3281, the output FIFO 3281 sends an ACK signal 3216 to the input FIFO 3231 through the spatial switch 3250. The ACK signal 3216 passes through the spatial switch 3250 and it is fed back to the input FIFO 3231 as an ACK signal 3218. When the ACK signal 3218 is sent back, the input FIFO 3231 outputs the next cell. When it is not sent back, the input FIFO 3231 outputs the same cell again.

The LCA filter 3271 in the transmission switching unit 2106 passes the cell having the LCA of its own and M="1" if the consecutive cells are to pass therethrough and filters off the cell having other LCA.

The LCA filter 3271 temporarily stores the call numbers of the leading cells, and permits serial switching and multiplexing of those cells which have M="1" and the same call numbers as the stored call numbers. After the cell having M="0" has been switched, if the call number of that cell matches to the stored call number, the switching and multiplexing of the cells from all input lines are permitted at the next step. If they do not match, the switching and multiple interruption of the cells having M="1" from other input lines are inhibited. For example, in FIG. 16, b1 is switched following to a1, and c2 is switched following to d, in accordance with the above principle.

The routing header added to the cell is effective only in the network, and the header is added only when the cell passes through the switching unit. Accordingly, after the cell has been switched, the header is not necessary and it is eliminated.

In accordance with the processing method in the transmission switching unit 2106, all input cells are sent but only one of the concurrently arriving cells is received and stored and the others are discarded. When it reaches the output unit, it sends back the response to the input unit for acknowledgment so that only those cells for which responses have not been received at the input unit are retransmitted to recover the discarded cells.

The cell transmission switching unit 2106 has the same LCA. When the cell having M="0" passes therethrough, the next arriving LCA is newly stored. The LCA filter 3271 has a counter to count the number of cells which consecutively pass through the filter. The count of the counter is always compared with a preset value 133, which is determined by a sum of 128=(maximum LAN data length·4096 bytes)/(cell length·32 bytes)+(margin·5).

When the counter overflows, the same process as that is taken when the cell having the same LCA and M="0" passes is performed.

The above process is an error process for the transmission switching unit 2106.

Instead of the comparison of the same LCA, R bit which is set when the consecutive switching is required may be used. In this case, the R bit is put in the header 517 of FIG. 4 as is the M bit.

We claim:
1. A network system comprising:
a plurality of individual LANs each accommodating plurality of terminals and operating on any LAN protocol;
a plurality of LAN interconnection switching units connected between said individually LANs in an interconnection network;
wherein each of said LAN interconnection switching units includes
(a) a set-up call table for receiving a data frame from an interconnected LAN and representing a relation of a call number assigned to a combination of a data source terminal address and a destination terminal address; and

(b) means for sending out a call set-up frame including a sequential address train of relaying LAN interconnection switching units connected between source and destination LAN interconnection switching units, and the call number.

2. A network system according to claim 1, wherein each of said LAN interconnection switching units includes:
   a filtering table for storing terminal addresses in the individual LAN directly connected to said LAN interconnection switching unit;
   a routing table for storing addresses of individual LANs other than the LAN directly connected to said LAN interconnection switching unit and an address train indicating a LAN interconnection switching unit for relaying data to be sent to a terminal of the other individual LANs designated by the addresses; and
   a structure table for storing a relationship between adjacent LAN interconnection switching units and output line numbers of the LAN interconnection switching unit.

3. A network system according to claim 1 wherein each of said LAN interconnection switching units includes means for sending out the data frame received from the LANs together with the call numbers.

4. A network system according to claim 2 wherein each of said LAN interconnection switching units includes an information generation unit for sending out the received data frame with a corresponding call number in the set-up call table without sending out a call set-up frame when a corresponding table has already been prepared in preparation of the set-up call table.

5. A network system according to claim 4 wherein each of said LAN interconnection switching units, when it receives a call set-up frame, determines a next adjacent relaying LAN interconnection switching unit from a LAN interconnection switching unit address train in the call set-up frame and prepares a relay table for storing an output line number determined from the structure table, a call number to be newly assigned and an input call number.

6. A network system according to claim 1 wherein each of said LAN interconnection switching units includes;
   (a) a transmission terminal unit having means for detecting an error by an error detection scheme in the data frame received from the interconnected LAN, and means for sending data of only an error-free data frame to said interconnection network; and
   (b) a reception terminal unit having means for detecting an error by the error detection scheme in the data frame, and means for transferring only the error free data to an interconnected destination LAN.

7. A network system according to claim 1 wherein each of said LAN interconnection switching units includes:
   means for adding information for controlling a switching sequence to a header attached to the data frame received from the individual LAN; and
   means for sequentially switching and multiplexing a series of packets generated from one user data without permitting the inclusion of packets having different call numbers, in accordance with the switching sequence control information and the call number assigned to the combination.

8. A data switching and multiplexing method comprising the steps of:
   switching and statistically multiplexing cells having call numbers preassigned to said cells by an out-of-band call control, said call numbers being the same if generated from user data; wherein said call numbers are included within a header which contains information for controlling a switching sequence; and
   continuously switching and multiplexing a series of cells which are generated from specific user data in accordance with said information until the last cell is reached without permitting inclusion of cells having other call numbers in their headers.

9. A data switching and multiplexing method according to claim 8, wherein a more data (M) bit for requesting said step of continuously switching and multiplexing a series of cells generated from the specific user data is used as the information for controlling the switching sequence contained in the header, the more data bit of only the last cell in a specific cell is set to "0" and the more data bit of other than last cells are set to "1", and the more data bit of an exceptional cell such as voice information is set to "0", and if a cell having M="0" exists during switching of a specific series of cells having M="1", the exceptional cell is first switched, and if a cell having M="" and a different call number exists, the specific series of cells are continuously switched until the last cell is reached and after the last cell of the specific series of cells has been switched, the cell having M="1" and the different call number is switched.

10. A data switching and multiplexing method according to claim 8 wherein when cells each including a header having a more data (M) bit and a call number, and user information are to be switched, a call number filter for eliminating the cell in accordance with the call number and the M bit is provided, call numbers of a series of leading cells are temporarily stored, continuous switching and multiplexing of those cells which have M="1" and call numbers equal to the stored call numbers are permitted, and if the cell having M="0" has been switched and the call number of that cell matches to the stored call number, the switching and multiplexing of the cells from all input lines are permitted in the next step, and if the call numbers do not match, the switching and multiple interruption of the cell having M="1" and supplied from another input line are inhibited.

11. A data switching and multiplexing apparatus method according to claim 8 wherein an R bit indicating the cells to be continuously switched and multiplexed is contained instead of the call number in the header in addition to the M bit, and after the cell having M="1" and R="1" has been switched and multiplexed, the switching and multiple interruption of the cell having R="1" and supplied from an input line to which the cell belongs are inhibited, and after the cell having M="0" and R="1" has been switched and multiplexed, the switching and multiple interruption of the cells from all input lines are permitted, and after the cell having R="0" has been switched and multiplexed, the process follows to that of the latest cell having R="1".

12. A data switching and multiplexing method according to claim 9 wherein when the cells continuously inputted from the same input line and having M="1" are to be switched and multiplexed, a maximum number of continuous cells determined by a maximum user data length and a cell length is stored, and the number of input cells is counted and the count is compared with the stored maximum number, and when the count exceeds the stored maximum number, an error is detected and the switching and multiplex interruption of the cells from all input lines are permitted.

* * * * *